United States Patent [19]
Hsu

[11] Patent Number: 5,833,822
[45] Date of Patent: Nov. 10, 1998

[54] ELECTROCHEMICAL CONVERTER HAVING OPTIMAL PRESSURE DISTRIBUTION

[75] Inventor: Michael S. Hsu, Lincoln, Mass.

[73] Assignee: Ztek Corporation, Waltham, Mass.

[21] Appl. No.: 814,852

[22] Filed: Mar. 15, 1996

Related U.S. Application Data

[63] Continuation of Ser. No. 287,092, Aug. 8, 1994, abandoned, which is a continuation-in-part of Ser. No. 215,466, Mar. 21, 1994, abandoned.

[51] Int. Cl.$^6$ .............................. C25B 9/00; C25B 9/04; C25B 11/02; C25B 15/08
[52] U.S. Cl. .......................... 204/270; 204/274; 429/32; 429/35; 429/19; 429/25; 429/26
[58] Field of Search .......................... 429/16, 19, 25–26, 429/32, 34–35; 204/269, 256, 258, 270, 274

[56] References Cited

U.S. PATENT DOCUMENTS

| | | | |
|---|---|---|---|
| 3,394,032 | 7/1968 | Danner | 429/26 |
| 3,432,353 | 3/1969 | Von Krusenstierna et al. | 429/39 |
| 3,460,991 | 8/1969 | White, Jr. | 429/30 |
| 3,505,114 | 4/1970 | Rohr | 429/32 |
| 3,526,548 | 9/1970 | Accorsi et al. | 429/38 X |
| 3,526,549 | 9/1970 | Archer et al. | 429/32 |
| 3,554,808 | 1/1971 | Fischer et al. | 429/32 |
| 3,607,427 | 9/1971 | White | 429/20 |
| 3,616,334 | 10/1971 | Aker et al. | 204/129 |
| 3,964,930 | 6/1976 | Reiser | 429/26 |
| 4,042,483 | 8/1977 | Bouy et al. | 204/290 F |
| 4,056,452 | 11/1977 | Campbell | 204/258 |
| 4,085,016 | 4/1978 | Janjua et al. | 204/104 |
| 4,087,976 | 5/1978 | Morrow, Jr. et al. | 60/643 |
| 4,197,362 | 4/1980 | Schmidberger et al. | 429/12 |
| 4,210,512 | 7/1980 | Lawrance et al. | 204/257 |
| 4,310,605 | 1/1982 | Early et al. | 429/18 |
| 4,478,918 | 10/1984 | Ueno et al. | 429/38 |
| 4,482,440 | 11/1984 | Kadija | 204/105 |
| 4,490,444 | 12/1984 | Isenberg | 429/31 |
| 4,490,445 | 12/1984 | Hsu | 429/32 |

(List continued on next page.)

FOREIGN PATENT DOCUMENTS

| | | |
|---|---|---|
| 0 338 823 | 10/1989 | European Pat. Off. . |
| 0 355 420 | 2/1990 | European Pat. Off. . |
| 0 357 025 | 3/1990 | European Pat. Off. . |
| 0 437 175 | 7/1991 | European Pat. Off. . |
| WO 94/13026 | 6/1994 | WIPO . |

OTHER PUBLICATIONS

Advanced Fuel Cell Development Progress Report for Apr.–Jun. 1983.
Annual Report Covering the Period Apr. 1, 1978 to Mar. 31, 1979 (Feduska et al.).

*Primary Examiner*—Donald R. Valentine
*Attorney, Agent, or Firm*—Thomas J. Engellenner; Anthony A. Laurentano; Lahive & Cockfield, LLP

[57] ABSTRACT

An electrochemical converter assembly having one or more converter elements having a peripheral edge. The converter element includes a series of electrolyte plates having an oxidizer electrode material on one side and a fuel electrode material on the opposing side, and a series of interconnector plates, alternately stacked with the electrolyte plates, that provide electrical contact with the electrolyte plates. The interconnector plate has a textured pattern that forms reactant-flow passageways. The converter assembly has a low pressure drop configuration that includes at least one passageway which is disposed generally in the central region of the converter element, for introducing one input reactant thereto, and at least one second passageway, for introducing the other reactant. A third passageway, outwardly spaced from the second passageway removes spent fuel from the reactant-flow passageways, and thus from the converter element. The spent reactants are discharged along the periphery of the electrochemical converter. The electrochemical converter assembly further includes a sealer material that forms a non-hermetic seal between the electrolyte plate and the interconnector plate.

49 Claims, 5 Drawing Sheets

U.S. PATENT DOCUMENTS

| | | | |
|---|---|---|---|
| 4,574,112 | 3/1986 | Breault et al. | 429/26 |
| 4,583,583 | 4/1986 | Wittel | 165/46 |
| 4,623,596 | 11/1986 | Kamoshita | 429/26 |
| 4,629,537 | 12/1986 | Hsu | 204/15 |
| 4,644,751 | 2/1987 | Hsu | 60/676 |
| 4,721,556 | 1/1988 | Hsu | 204/258 |
| 4,839,247 | 6/1989 | Levy et al. | 204/269 X |
| 4,853,100 | 8/1989 | Hsu | 204/262 |
| 5,115,696 | 5/1992 | Barp | 429/26 |
| 5,149,601 | 9/1992 | Shiratori et al. | 429/32 X |
| 5,185,219 | 2/1993 | Ishihara et al. | 429/32 X |
| 5,277,994 | 1/1994 | Sprouse | 429/25 X |
| 5,298,341 | 3/1994 | Khandar et al. | 429/32 |

ELECTROCHEMICAL CONVERTER HAVING OPTIMAL PRESSURE DISTRIBUTION

RELATED APPLICATIONS

This application is a continuation of application Ser. No. 08/287,092 filed on Aug. 8, 1994 now abandoned, which is a continuation-in-part of United States Ser. No. 08/215,466, entitled "Electrochemical Converter Having Optimal Pressure Distribution", filed on Mar. 21, 1994 now abandoned.

BACKGROUND OF THE INVENTION

This invention relates to electrochemical converters employing electrolyte material, as well as to assemblies employing such components.

The key components in an electrochemical converter are a series of electrolyte units onto which electrodes are applied, and a similar series of interconnector units, disposed between the electrolyte units, to provide serial electrical connections. Each electrolyte unit is typically an ionic conductor having low ionic resistance, thereby allowing the transport of an ionic species from one electrode-electrolyte interface to the opposite electrode-electrolyte interface under the particular operating conditions of the converter.

Various electrolytes can be used in such converters. For example, zirconia stabilized with such compounds as magnesia, calcia or yttria can satisfy these requirements when operating at an elevated temperature, e.g., about 1000° C. These electrolyte materials utilize oxygen ions to carry electrical current. Generally, the electrolyte does not conduct electrons which can cause a short-circuit of the converter. The interconnector unit, on the other hand, is typically a good electronic conductor. In operation, the interaction of the input reacting gas, electrode and electrolyte occur at the electrode-electrolyte interface, which requires that the electrodes be sufficiently porous to admit the reacting gas species, and to permit exit of product gas species.

The approach of forming electrochemical converters from electrolyte and interconnector components, and the bulk integration thereof were disclosed by the present inventor in U.S. Pat. No. 4,490,445, issued Dec. 25, 1984; U.S. Pat. No. 4,629,537, issued Dec. 16, 1986; U.S. Pat. No. 4,721,556, issued Jan. 26, 1988, which are herein incorporated by reference. In particular, U.S. Pat. No. 4,490,445 discloses an electrochemical converter that employs interconnector plates having corrugated patterns that provide passageways for the distribution of reactants. The corrugated pattern resembles a series of concentric ridges that are intermittently interrupted by a number of slots. The outer ridges on the interconnector plates press against the electrolyte plate to form a sealed and substantially gas-tight outer wall. Oxidizer and fuel gases, e.g., input reactants, are fed to the electrochemical converter by separate manifold ports that aperture the stack and extend longitudinally therethrough. Separate manifolds exhaust the oxidizer and fuel products from the converter. The manifolds are disposed close to the periphery of the cell stack.

This and other prior art approaches teach an electrochemical converter that has a relatively high axial pressure drop that forms along the length of the converter stack, as well as radially through the electrolyte and interconnector units. This high pressure drop is generated by the restrictive size of the exhaust manifolds employed, thus creating a relatively non-uniform flow of reactants through the ridges of the interconnector plate. Furthermore, the electrochemical converter assembly has stringent interplate bonding requirements to ensure that a substantially perfect gas-tight seal forms between the electrochemical converter constituent plates, and along the outside of the converter.

Hence, there exists a need in the art for a compact, efficient electrochemical converter that exhibits improved pressure tolerance and reactant flow uniformity, while relaxing inter-plate bonding requirements. In particular, an electrochemical converter that develops a low pressure differential along the length of the converter and radially through the interconnector ridges, which, in turn, relaxes the interplate bonding requirements, would satisfy a long felt in the art. Moreover, an electrochemical converter that has improved reactant flow uniformity would also satisfy a long felt need. Furthermore, an electrochemical converter assembly that has increased system efficiency would also be desirable.

SUMMARY OF THE INVENTION

The present invention provides a system for producing a low pressure drop, substantially uniform-flow electrochemical converter. A low pressure drop converter is achieved by employing a relatively large exhaust manifold relative to the input reactant manifolds. This is attained by discharging the spent reactants along a substantial peripheral portion of the converter. Moreover, reducing the axial pressure drop along the electrochemical converter relaxes the interplate bonding requirements.

The system of the present invention includes an electrochemical converter assembly having one or more converter elements having a peripheral edge. The converter element includes a series of electrolyte plates having an oxidizer electrode material on one side and a fuel electrode material on the opposing side, and a series of interconnector plates, alternately stacked with the electrolyte plates, that provide electrical contact with the electrolyte plates. The interconnector plate has a textured pattern that forms reactant-flow passageways. These passageways selectively distribute the fuel and oxidizer reactants introduced to the columnar converter element. For example, the passageways distribute the fuel reactant over the fuel electrode side of the electrolyte plate, and the oxidant reactant over the oxidizer electrode side of the electrolyte plate. Alternatively, a spacer plate can be interposed between the electrolyte and interconnector plates to provide passageways through which the reactants can flow. The spacer plate can be either a corrugated or perforated plate.

The electrochemical converter assembly of the present invention provides a low pressure drop configuration that produces a substantially uniform flow of reactants through the columnar converter elements, while also providing a substantially low differential pressure condition through the reactant-flow passageways. The assembly includes at least one passageway which is disposed generally in the central region of the converter element, for introducing one input reactant thereto, and at least one second passageway, for introducing the other reactant. The second passageway preferably is outwardly spaced from the first central passageway, and adapted to deliver the other reactant to the opposite side of the converter elements in the first reactant. The spent reactants are discharged from the fuel cell along a peripheral portion of the converter element.

According to another aspect of the invention, a third passageway, outwardly spaced from the second passageway removes spent fuel from the reactant-flow passageways, and thus from the converter element. The removed fuel is preferably relatively pure carbon dioxide. In one embodiment, the oxidizer reactant is introduced to the converter element through the first passageway, and the fuel reactant is introduced to the converter element through the second passageway. Additionally, the spent fuel contained in the third passageway can be used to reform the input fuel reactant.

The electrochemical converter assembly can further include a sealer material that forms a non-hermetic seal between the electrolyte plate and the interconnector plate. The sealer is disposed along the junctions between the interconnector plate and the first, second and third passageways. The sealer material, when selectively applied to the intermediate plate, allows one input reactant to flow through the reactant-flow passageways on that side of the interconnector plate. For example, the absence of the sealer internal about the first passageway allows the oxidizer reactant to flow across the oxidizer electrode surface of the electrolyte plate. The sealer material at the first passageway prevents the oxidizer from enforcing the fuel electrode side of the interconnector plate. Likewise, the absence of the sealer element material at the junction of the second passageway and the interconnector plate allows fuel reactant to pass therethrough, and to contact the fuel electrode surface of an electrolyte plate.

According to further aspects of the invention, the textured pattern of the interconnector plate comprises a dimpled surface which forms or defines the reactant-flow passageways, while establishing electrical contact with the adjacent plate components. The first central passageway can also be adapted to receive a support element that provides structural support to the columnar converter element. The support element can include at least one spring-loaded tie rod assembly, for providing a selected compressive force to the electrochemical converter assembly for compressing the electrolyte and interconnector plates together.

According to still further aspects, the converter assembly releases heat from the outer surface of the converter element to an external environment. This heat transfer can either be performed by conductive, convective, or radiant heat transfer. Additionally, the spent reactants discharged from the peripheral edges of the columnar converter element can be collected in a thermal enclosure element disposed about the converter element. Preferably, the thermal enclosure element is a thermally conductive heat conduit. The spent reactants can be subsequently conveyed to a bottoming plant, and the exhaust heat is preferably transferred thereto.

In an alternate embodiment of the invention, the converter assembly can have a substantially rectilinear shape.

The invention will next be described in connection with certain preferred embodiments. However, it should be clear that various changes and modifications can be made by those skilled in the art without departing from the spirit and scope of the invention. For example, the number of first, second and third passageways can vary depending upon the operational requirements of the system.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DETAILED DESCRIPTION

Figure 1:
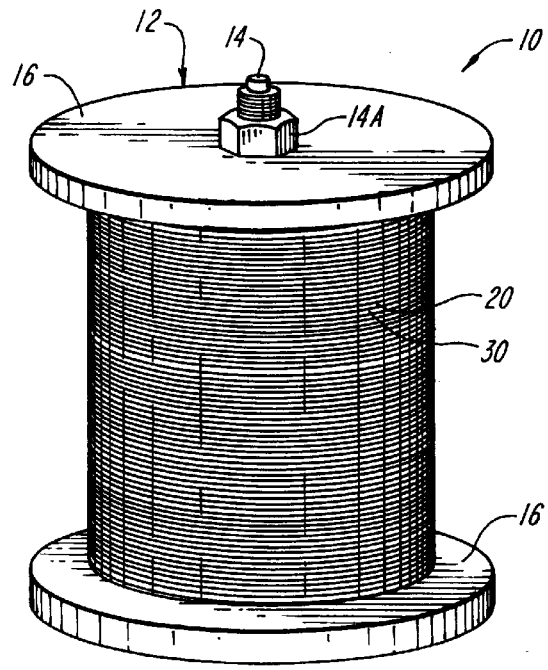
FIG. 1 is an isometric view of an assembled electrochemical converter and its associated assembly hardware.

FIG. 1 shows an isometric view of an electrochemical converter 10 according to a preferred embodiment of the invention. The electrochemical converter 10 is shown consisting of alternating layers of an electrolyte plate 20 and an interconnector plate 30. Holes or manifolds formed in the electrochemical converter provide conduits for the passage of fuel and oxidizer gases, e.g., input reactants. Reactant-flow passageways formed in the interconnector plates, FIG. 3, facilitate the distribution and collection of these gases.

Figure 3:
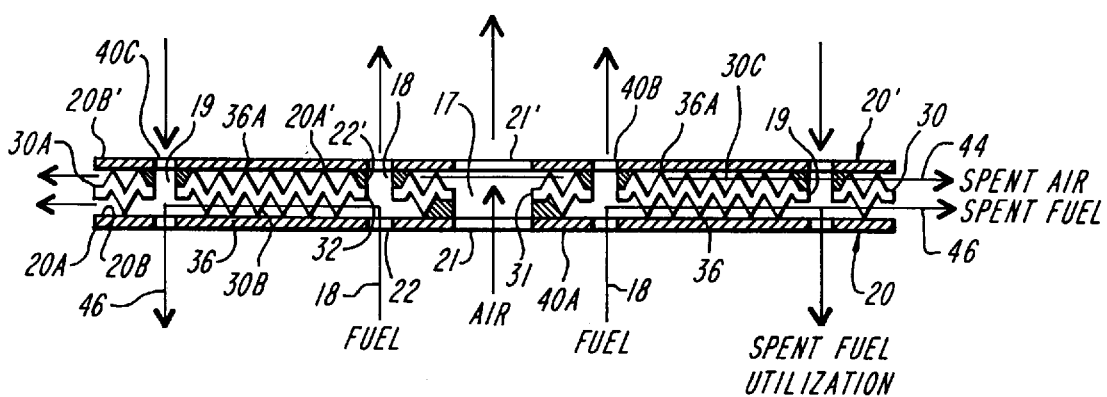
FIG. 3 is a cross-sectional view of an interconnector component and an electrolyte component according to the invention.

The plates of the electrochemical converter 10 are held in compression by a spring loaded tie-rod assembly 12. The tie-rod assembly 12 includes a tie-rod member 14 seated within a central oxidizer manifold 17, as shown in FIG. 3, that includes an assembly nut 14A. A pair of endplates 16 mounted at either end of the electrochemical converter element 10, protects the interconnector and electrolyte plates from damage caused by these rigid structural components during compression of the plates. Compressing the interconnector plates 30 and the electrolyte plates 20 together maintains the electrical contact between the plates and provides gas sealing at appropriate places within the assembly.

Figure 2A:
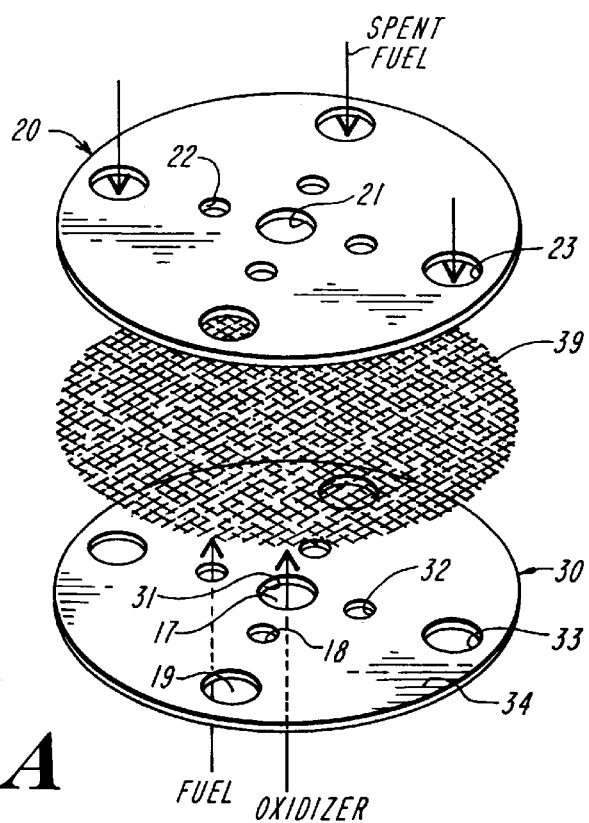
FIG. 2A is a more detailed isometric view of the electrolyte component and the interconnector component.
Figure 2B:
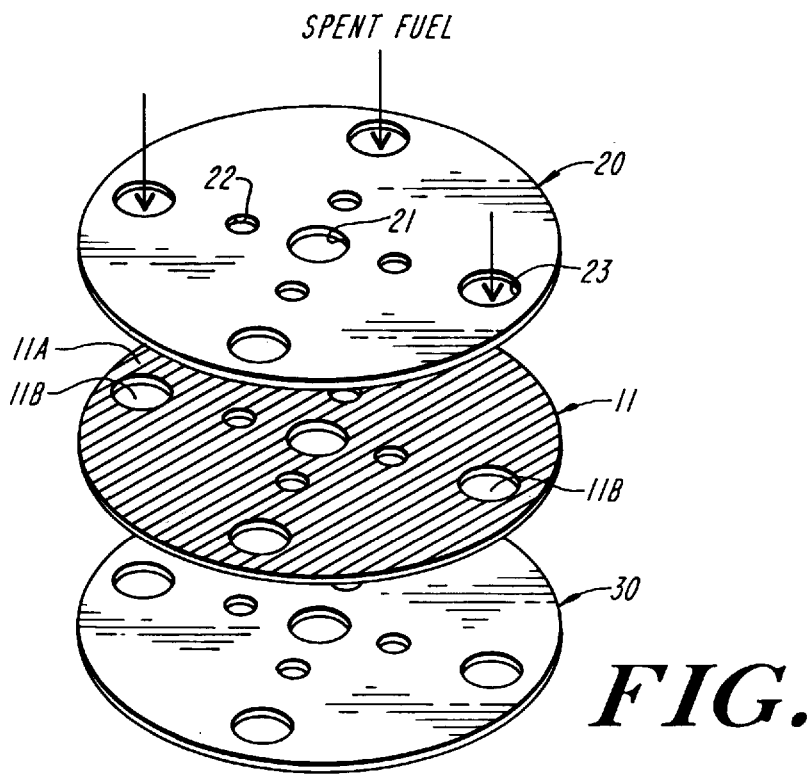
FIG. 2B is a more detailed isometric view of the electrolyte component, an interconnector component, and a spacer component.

FIGS. 2A and 2B and 3 illustrate the basic cell unit of the electrochemical converter, which includes an electrolyte plate 20 and an interconnector plate 30. In one embodiment, the electrolyte plate 20 can be made of a ceramic, such as a stabilized zirconia material $ZrO_2(Y_2O_3)$, on which a porous oxidizer electrode material 20A and a porous fuel electrode material 20B are coated. Exemplary materials for the oxidizer electrode material are perovskite materials, such as $LaMnO_3(Sr)$. Exemplary materials for the fuel electrode material are cermets such as $ZrO_2/Ni$ and $ZrO_2/NiO$.

The interconnector plate 30 preferably is made of an electrically conductive interconnect material. Examples of such material include nickel alloys, platinum alloys, non-metal conductors such as silicon carbide, $La(Mn)CrO_3$, and preferably commercially available Inconel, manufactured by Inco., U.S.A. The interconnector plate 20 serves as the electric connector between adjacent electrolyte plates and as a partition between the fuel and oxidizer reactants. As best shown in FIG. 3, the interconnector plate 30 has a central aperture 31 and a number of concentric radially outwardly spaced apertures 32. A third set of apertures 33 are disposed along the outer cylindrical portion of the plate 30.

The interconnector plate 30 has a textured outer surface 34. The textured surface preferably has formed thereon a series of dimples 36, as shown in FIG. 3. The dimpled surface of the interconnector plate forms a series of connecting reactant-flow passageways. Preferably, both sides of the interconnector plate 30 have the dimpled surface formed thereon. Although the second and third set of apertures 32 and 33, respectively, are shown with a selected number of apertures, those of ordinary skill will recognize that any number of apertures can be employed, depending upon the system and reactant-flow requirements.

Likewise, the electrolyte plate 20 has apertures 21, 22 and 23 formed at locations complementary to the apertures 31, 32 and 33, respectively, of the interconnector plate 30.

As shown in FIG. 2A, a reactant flow adjustment element 39 can be interposed between the electrolyte plate 20 and the interconnector plate 30. The flow adjustment element 39 serves as a fluid-flow impedance between the plates, which restricts the flow of the input reactants flowing into the reactant-flow passageways. Thus, the flow adjustment element provides for greater uniformity of flow. A preferred flow adjustment element is a wire mesh or screen, but any suitable design can be used, provided it restricts the flow of the input reactants into the reactant-flow passageways at a selected rate.

Referring to FIG. 2B, a spacer plate 11 can be interposed between the electrolyte plate 20 and the interconnector plate 30. The spacer plate 11 preferably has a corrugated surface 11A that forms a series of connecting reactant-flow passageways. The spacer plate 11 also has a series of apertures 11B formed at locations complementary to the apertures of the interconnect and electrolyte plates, as shown. Further, in this arrangement, the interconnector plate 20 is devoid of reactant-flow passageways. The spacer plate 11 is preferably made of an electrically conductive material, such as nickel and platinum allots, and preferably commercially available Inconel.

Referring to FIG. 3, when the electrolyte plates 20 and the interconnector plates 30 are alternately stacked and aligned along their respective apertures, the apertures form axial (with respect to the stack) manifolds that feed the cell unit with the input reactants, and that exhaust spent fuel. In particular, the central apertures 31,21 form input oxidizer manifold 17, the concentric apertures 32,22 form input fuel manifold 18, and the aligned outer apertures 33,23 form spent fuel manifold 19.

The dimpled surface 34 of the interconnector plate 30 has, in the cross-sectional view of FIG. 3, a substantially corrugated pattern formed on both sides. This corrugated pattern forms the reactant-flow passageways that channel the input reactants to the periphery of the interconnector plates. The interconnector plate also has a flat annular lip 30A formed at the periphery of the plate. The absence of a ridge or other raised structure at the plate periphery provides for exhaust ports that communicate with the external environment. The reactant-flow passageways connect, fluidwise, the input reactant manifolds with the annular lip 30A, thus allowing the reactants to be exhausted to the external environment, or to a thermal container disposed about the electrochemical element 10, FIG. 5.

Referring to FIG. 3, a filler material 40 is applied to the interconnector plate 30 at selected portions of the manifold junctions. As used herein, the term "filler material" is intended to include any inert, non-porous or low porosity material that is compatible with either the interconnector material or the electrolyte material, and that has a thermal coefficient of expansion substantially equal to the expansion coefficients of the electrolyte plate or the interconnector plate. The amount of filler material employed is that amount sufficient to substantially reduce the leakage path of the input reactants from the manifolds. According to a preferred aspect of the invention, "a sufficient amount" is that amount that inhibits bonding of the filler material to either the electrolyte or interconnector plates. Bonding of the filler material to the interconnector and electrolyte plates is undesirable since it jeopardizes the thermal cycling ability of the electrochemical converter. The filler material can be in the form of a paste or a solid, e.g., an O-ring, and, for example, can be composed of Inconel.

As shown in FIG. 3, the filler material 30 can be applied to selected portions of the interconnector plate 30, thus allowing a particular input reactant to flow across the interconnector surface and across the mating surface of the electrolyte plate 20. The interconnector plate bottom 30B contacts the fuel electrode coating 20B of the electrolyte plate 20. In this arrangement, it is desirable that the filler material only allow fuel reactant to enter the reactant-flow passageway, and thus contact the fuel electrode.

As illustrated, the filler material 40A is disposed about the input oxidizer manifold 17, forming an effective reactant flow barrier about the oxidizer manifold 17. The filler material helps maintain the integrity of the fuel reactant contacting the fuel electrode side 20B of the electrolyte plate 20, as well as maintain the integrity of the spent fuel exhausted through the spent fuel manifold 19.

The top 30C of the interconnector plate 30 has the filler material 40 disposed about the fuel input manifolds 18 and the spent fuel manifold 19. The top of the interconnector plate 30C contacts the oxidizer coating 20B' of an opposing electrolyte plate 20'. Consequently, the filler material 40A that surrounds the input oxidizer manifold 17 is devoid of filler material, thereby allowing the oxidizer reactant to enter the reactant-flow passageways. The filler material 40B that completely surrounds the fuel manifolds 18 inhibits the excessive leakage of the fuel reactant into the reactant-flow passageways, thus inhibiting the mixture of the fuel and oxidizer reactants. Similarly, the filler material 40C that completely surrounds the spent fuel manifold 19 inhibits the flow of spent oxidizer reactant into the spent fuel manifold 19. Hence, the purity of the spent fuel that is pumped through the manifold 19 is maintained.

Referring again to FIG. 3, the oxidizer reactant can be introduced to the electrochemical converter 10 through axial manifold 17 that is formed by the apertures 21', 21 and 31 of the electrolyte and interconnector plates 20', 20 and 30, respectively. The oxidizer is distributed over the top of the interconnector plate 30C, and over the oxidizer electrode surface 20A' by the reactant-flow passageways. The spent oxidizer then flows radially outward toward the interconnector lip 30A, and is finally discharged at the converter element peripheral edge. The filler material 40C inhibits the flow of oxidizer into the spent fuel manifold 19. The flow path of the oxidizer through the cell unit depicted in FIG. 2 is illustrated by the solid black arrow 44.

The fuel reactant is introduced to the electrochemical converter 10 by way of fuel manifold 18 formed by the aligned apertures 22', 22 and 32 of the plates. The fuel is introduced to the reactant-flow passageways and is distributed over the bottom of the interconnector plate 30B, and over the fuel electrode coating 20B of the electrolyte plate 20. Concomitantly, the filler material 40A, FIG. 4B, prevents the input oxidizer reactant from entering the reactant-flow passageways and thus mixing with the pure fuel/spent fuel reactant mixture. The absence of any filler material at the spent fuel manifold 19 allows spent fuel to enter the manifold 19. The fuel is subsequently discharged at the annular lip 30A of the interconnector plate 30. The flow path of the fuel reactant is illustrated by the solid black arrows 46, FIG. 2.

The dimples 36 of the interconnector surface have an apex 36A that contact the electrolyte plates in assembly to establish an electrical connection therebetween. Additionally, the cell stack is secured by the tie-rod assembly 12 that is preferably mounted in the input oxidizer manifold 17 to provide a compressive assembly force. Alternatively, the cell stack can be secured by water-cooled tension rods (not shown) that can be mounted within bolt-holes located at the periphery of the cell stack.

It is to be understood that the electrochemical converter 10 of this invention can be utilized as a fuel cell, e.g., an electric generator, when gaseous fuel is applied to the converter or can be utilized as an electrolyzer, e.g., fuel synthesizer, when electricity is applied. For example, it is applicable to all reversible reactions involving exchanging of oxygen such as:

$$H_2 + \tfrac{1}{2}O_2 = H_2O$$

$$SO_2 + \tfrac{1}{2}O_2 = SO_3$$

$$CO + \tfrac{1}{2}O_2 = CO_2$$

and $$NH_3 + \tfrac{5}{4}O_2 = NO + \tfrac{3}{2}H_2O.$$

Furthermore, to achieve a simple, compact, lightweight and more highly efficient electrochemical converter, cell components having the above shaped patterns with a relatively thin structure are desired. The interconnector plate 30 of the present invention has a central first reactant manifold and one or more concentric second reactant manifolds. Input reactants that enter these manifolds are discharged from the electrochemical converter at the peripheral edge of the converter. Discharging the reactants along the peripheral edge of the converter provides a relatively large exhaust manifold for purging spent reactants. This relatively large exhaust manifold provides for greater uniformity of flow of the reactants across the interconnector and electrolyte plates. Moreover, to increase the uniformity of flow of the reactants, the flow adjusting element can be interposed between the interconnector and electrolyte plates. Additionally, inputting the reactants from the center of the cell stack and discharging the spent reactants at the periphery, provides a relatively low pressure electrochemical converter. A typical pressure drop of less than one pound per square inch (psi) can be consistently obtained.

A wide variety of conductive materials can be used for the thin interconnector plates of this invention. Such materials should meet the following requirements: (1) high strength, as well as electrical and thermal conductivity; (2) good oxidation resistance up to the working temperature; (3) chemical compatibility and stability with the input reactants; and (4) manufacturing economy when formed into the textured plate configuration exemplified by reactant-flow passageways.

The suitable materials for interconnector fabrication include nickel alloys, nickel-chromium alloys, nickel-chromium-iron alloys, iron-chromium-aluminum alloys, platinum alloys, cermets of such alloys and refractory material such as zirconia or alumina, silicon carbide and molybdenum disilicide.

The textured patterns of the top and bottom of the interconnector plate can be obtained, for example, by stamping the metallic alloy sheets with one or more sets of matched male and female dies. The dies are preferably prefabricated according to the desired configuration of the interconnector plate, and can be hardened by heat treatment to withstand the repetitive compressing actions and mass productions, as well as the high operating temperatures. The stamp forming process for the interconnectors preferably as conducted in multiple steps due to the geometrical complexity of the gas passage networks, e.g., the dimpled interconnector plate surface. The manifolds formed in the interconnector plates are preferably punched out at the final step. Temperature annealing is recommended between the consecutive steps to prevent the overstressing of sheet material. The stamping method is capable of producing articles of complex geometry while maintaining uniform material thickness.

Alternatively, corrugated interconnectors can be formed by electrode-position on an initially flat metal plate using a set of suitable masks. Silicon carbide interconnector plates can be formed by vapor deposition onto pre-shaped substrates, by sintering of bonded powders, or by self-bonding processes.

Figure 4:
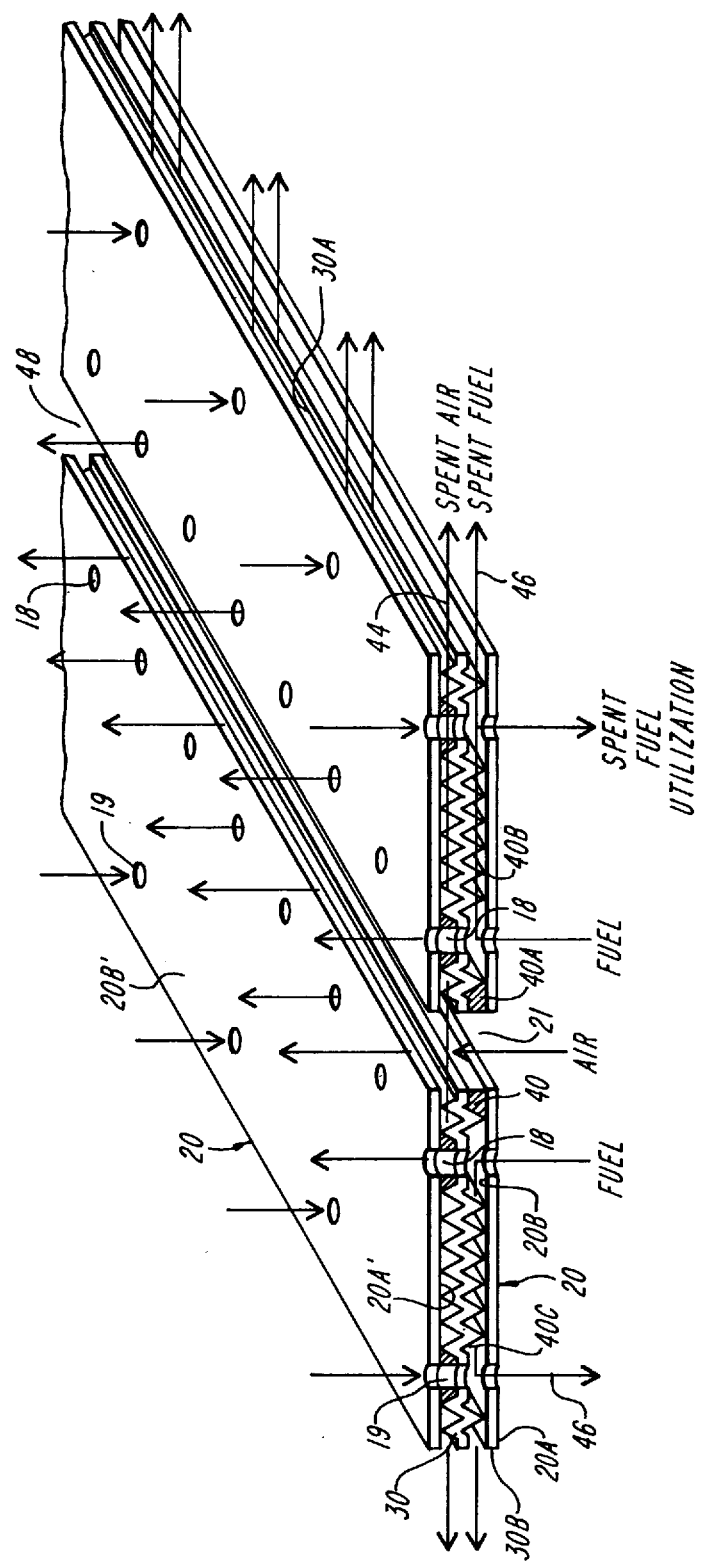
FIG. 4 is an isometric view of another embodiment of the electrochemical converter element of the present invention.

In another embodiment of the invention, the electrochemical converter element 50 can have a substantially rectilinear configuration, as shown in FIG. 4. The illustrated cell stack unit has an interconnector plate 30 disposed between a pair of electrolyte plates 20 and 20'. The basic construction of the electrolyte and interconnector plates is as described above, and as illustrated by FIG. 3.

The input oxidizer manifold 17 can be a substantially rectilinear channel 48, as shown. The input fuel manifolds 18 are disposed on either side of the manifold channel 17 and are substantially parallel thereto. The spent fuel manifolds 19 are outwardly spaced from the manifolds 18 and are located towards the edge of the cell stack. As previously described, the input manifolds 17 and 18 feed the oxidizer and fuel reactants, respectively, to the cell stack. The filler material 40A–40C located at the manifolds 17, 18 and 19 inhibits the flow of reactants into undesirable locations. For example, the filler material 40A disposed about the input oxidizer manifold 17 located at the bottom 30B of the interconnector plate 30 inhibits the flow of oxidizer into the reactant-flow passageways, thus inhibiting the oxidizer from contacting the fuel electrode coating 20B of the electrolyte plate 20. Concomitantly, the central aperture 31 is devoid of filler material, thereby allowing the fuel reactant to flow into the reactant-flow passageways and over the fuel electrode coating.

Similarly, the top of the interconnector plate 30C, which contacts the oxidizer coating 20A' of the electrolyte plate 20', has filler material 40B dispersed about the fuel manifold 18 and the spent fuel manifold 19. The absence of any filler material at the input manifold 17 allows the oxidizer reactant to enter the reactant-flow passageways and thus contact the oxidizer coating 20B'. The filler material 40B and 40C prevents oxidizer reactant from flowing into the input fuel manifold 18 and the spent fuel manifold 19.

Figure 5:
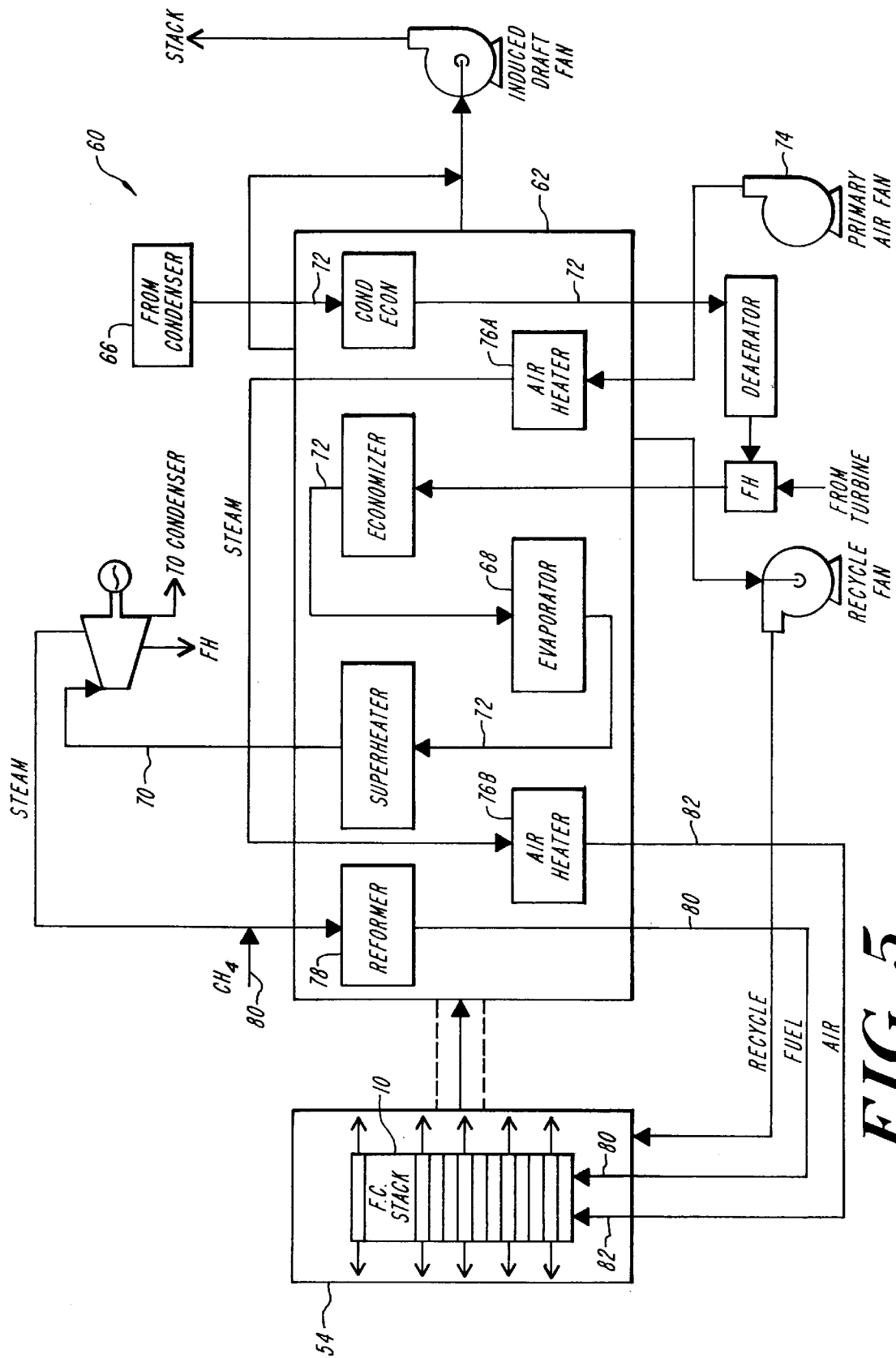
FIG. 5 is a schematic illustration of a power system in thermal communication with an electrochemical converter element of the present invention.

FIG. 5 shows the electrochemical converter 10 of the present invention thermally integrated with a power system 60 by a thermally conductive conduit 54. The conduit 54 collects the spent fuel and oxidizer reactants that are discharged from the periphery of the electrochemical converter, and transfers the exhaust to the power system 60. The exhaust heat is then transferred to the working medium 72 (denoted by the solid connecting lines) of the power system 60. For example, when the electrochemical converter is thermally integrated with a steam generating system 62, the exhaust heat from the spent reactants collected in the conduit 54 is transferred to water tubes 72 distributed within the steam generator. Water is supplied to the water tubes by a reservoir 66. Steam, generated by the heated working medium, collects in the boiler drum 68. The steam can be removed from the system by any suitable conduit, such as by the steam pipe 70. This steam can then be used directly in industrial applications for various processes or can be used, for example, in residential or commercial applications for heating and the like.

Further, air can be introduced to the steam generator 62 by a primary fan 74. The fan 74 forces air through a pair of air heaters 76A and 76B. The air heaters heat the air to a selected elevated temperature for subsequent introduction to the electrochemical converter 10. Thus, the air heaters preheat the oxidizer reactant prior to feeding the reactant into the converter 10 (by way of air conduit 82), thereby ensuring optimal performance of the electrochemical converter.

The fuel reformer 78 reforms the fuel fed to the reformer from the fuel input 80. The reformed fuel is subsequently fed to the converter by any suitable means, such as by fuel conduit 80.

According to one practice, the electrochemical converter 10 delivers exhaust at 1800° C. to the heat recovery steam generating system 62, while concomitantly receiving preheated air and preheated/reformed fuel. The air is preheated by the air heater 76B, and the fuel is preheated and reformed by the reformer 80 which accepts steam generated by the super heater 73, evaporator 68, and economizer 75.

The electrochemical converter of the present invention can be thermally integrated with any suitable bottoming plant, such as with the steam generator shown, which is commercially available and manufactured by Foster Wheeler, Livingston, N.J., U.S.A.

Figure 6:
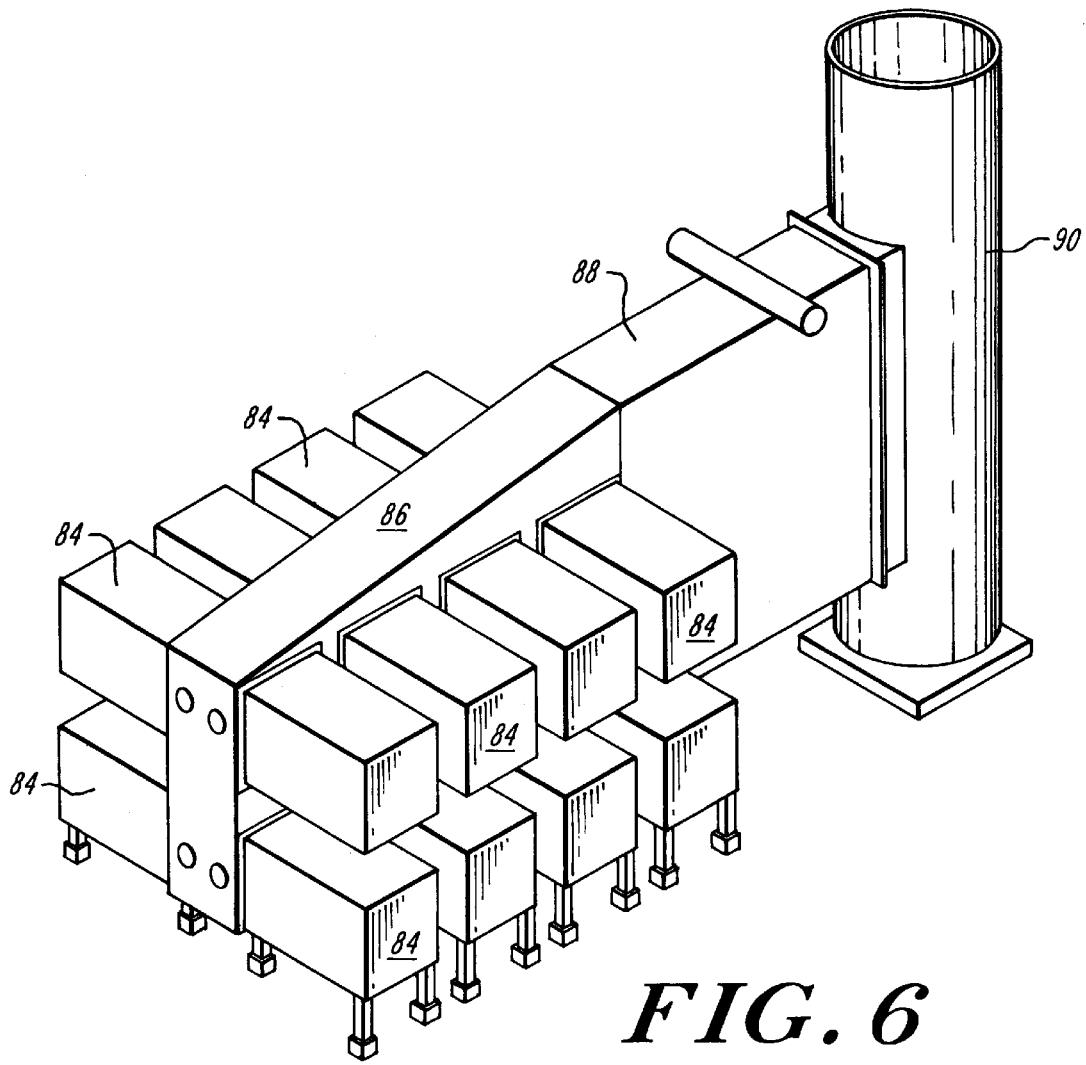
FIG. 6 is a schematic illustration of a preferred thermal arrangement of an electrochemical converter and a bottoming plant.

Additionally, the electrochemical converter 10 can be directly thermally integrated with the steam-generation system, as shown in FIG. 6. The electrochemical converters are housed within separate thermal housings 84 that are preferably directly fastened to the steam generating system. The thermal housings are in thermal communication with a central heat conduit 86. A second thermal container 88 houses the steam generator 62 of FIG. 5. An exhaust stack 90 exhausts heated air and other reactants to the external environment.

It will thus be seen that the invention contains improvements over the prior art. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween. For example, the low pressure drop electrochemical converter of the present invention can also employ molten carbonate, phosphoric acid, and proton exchange membrane converters.

Having described the invention, what is claimed as new and desired to be secured by letters patent is:

1. An electrochemical converter assembly, comprising
   a stack of converter plate elements having unsealed peripheral edges including
   a plurality of electrolyte plates having an oxidizer electrode material on one side and a fuel electrode material on the opposing side, and
   a plurality of interconnector plates for providing electrical contact with said electrolyte plates, wherein said stack of converter elements is assembled by alternately stacking interconnector plates with said electrolyte plates, and
   low pressure drop reactant flow means for producing a substantially uniform flow of reactants through said stack of converter elements, and for producing a substantially low differential pressure condition within said converter assembly, such that spent fuel and oxidizer reactants are discharged from said converter assembly along at least a substantial portion of said peripheral edges of said converter element.

2. The electrochemical converter assembly of claim 1 wherein said interconnector plate has a textured pattern formed thereon for providing reactant-flow passageways for the distribution of a fuel reactant and an oxidizer reactant introduced to said converter assembly, said passageways channeling said fuel reactant over said fuel electrode surface and said oxidant reactant over said oxidizer electrode surface.

3. The electrochemical converter assembly of claim 2 further comprising flow adjustment means, interposed between said interconnector plate and said electrolyte plate, for adjusting the pressure drop of said reactants in said reactant-flow passageways.

4. The electrochemical converter assembly of claim 3 wherein said flow adjustment means is a wire mesh.

5. The electrochemical converter assembly of claim 2 wherein said reactant-flow passageways are formed on at least one side of said electrolyte plate.

6. The electrochemical converter assembly of claim 2 wherein said textured pattern comprises a dimpled surface forming said reactant-flow passageways.

7. The electrochemical converter assembly of claim 1 further including a spacer plate, disposed between said interconnector plate and said electrolyte plate, for distributing a fuel reactant introduced to said converter assembly over said fuel electrode surface, and an oxidizer reactant introduced to said converter assembly over said oxidizer electrode surface.

8. The electrochemical converter assembly of claim 1 wherein said converter element further comprises
   first aperture means forming one or more first centrally disposed passageway in said converter element for introducing one of said fuel and oxidizer reactants to said converter element, and
   second aperture means forming one or more second passageway in said converter element, spaced outwardly from said first passageway, for introducing the other of said reactants.

9. The electrochemical converter assembly of claim 8 further comprising third aperture means outwardly spaced from said second aperture means, for forming one or more third passageways for removing spent fuel from said converter element.

10. The electrochemical converter assembly of claim 9 wherein said third aperture means facilitates removal of $CO_2$ from said converter assembly prior to discharge at said converter periphery.

11. The electrochemical converter assembly of claim 8 wherein said first aperture means is adapted to receive said oxidizer reactant.

12. The electrochemical converter assembly of claim 11 wherein said second aperture means is adapted to receive said fuel reactant.

13. The electrochemical converter assembly of claim 8 wherein said sealer means is disposed along selected portions of said interconnector plate at least at one of said first and second passageways, to selectively prevent at least one of said fuel and oxidizer reactants to flow through said reactant-flow passageways.

14. The electrochemical converter assembly of claim 8 wherein said first aperture seats support means for providing structural support to said converter assembly.

15. The electrochemical converter assembly of claim 14 wherein said support means comprises at least one spring loaded tie-rod assembly, said tie-rod assembly providing a selected compressive force to said converter assembly for compressing said electrolyte and interconnector plates together.

16. The electrochemical converter assembly of claim 1 further comprising reforming means for reforming said fuel reactant into $H_2$ and CO.

17. The electrochemical converter assembly of claim 1 further comprising sealer means forming a non-hermetic seal between said electrolyte plates and said interconnector plates.

18. The electrochemical converter assembly of claim 17 wherein said sealer means is a filler material.

19. The electrochemical converter assembly of claim 1 further comprising thermal enclosure means, enclosing said electrochemical converter assembly, for collecting said spent reactants discharged from said converter element at said peripheral edge.

20. The electrochemical converter assembly of claim 19 wherein said thermal enclosure means is a heat conduit.

21. The electrochemical converter assembly of claim 20 wherein said thermal enclosure means conveys said collected spent reactants to a bottoming plant.

22. The electrochemical converter assembly of claim 1 wherein said converter element has an outer surface adapted to be a heat exchange surface.

23. The electrochemical converter assembly of claim 22 wherein said heat exchange surface radiatively exchanges heat between said surface and an external environment.

24. The electrochemical converter assembly of claim 22 wherein said heat exchange surface conductively exchanges heat between said surface and an external environment.

25. The electrochemical converter assembly of claim 22 wherein said heat exchange surface convectively transfers heat from said outer surface to an external environment.

26. The electrochemical converter assembly of claim 1 wherein said converter assembly has a substantially columnar shape.

27. The electrochemical converter assembly of claim 1 wherein said converter assembly has a substantially rectilinear shape.

28. An electrochemical converter assembly comprising
a stack of converter plate elements having unsealed peripheral edges including
a plurality of electrolyte plates having an oxidizer electrode material on one side and a fuel electrode material on the opposing side, and
a plurality of interconnector plates for providing electrical contact with said electrolyte plates, wherein said stack of converter elements is assembled by alternately stacking interconnector plates with said electrolyte plates,
peripheral exhaust removal means for discharging spent oxidizer and fuel reactants along at least a substantial portion of said peripheral edge of said converter assembly, and
sealer means in contact with said interconnector plate and said electrolyte plate for forming a non-hermetic seal between said electrolyte and interconnector plates.

29. The electrochemical converter assembly of claim 28 wherein said interconnector plate has a textured pattern formed thereon for providing reactant-flow passageways for the distribution of a fuel reactant and an oxidizer reactant introduced to said converter assembly, said reactant-flow passageways channeling said fuel reactant over said fuel electrode surface and said oxidant reactant over said oxidizer electrode surface.

30. The electrochemical converter assembly of claim 29 wherein said textured pattern comprises a dimpled surface forming reactant-flow passageways.

31. The electrochemical converter assembly of claim 28 further including a spacer plate, disposed between said interconnector plate and said electrolyte plate, for distributing a fuel reactant introduced to said converter assembly over said fuel electrode surface, and an oxidizer reactant introduced to said converter assembly over said oxidizer electrode surface.

32. The electrochemical converter assembly of claim 29 further comprising flow adjustment means, interposed between said interconnector plate and said electrolyte plate, for adjusting the pressure drop of said reactants in said reactant-flow passageways.

33. The electrochemical converter assembly of claim 32 wherein said flow adjustment means is a wire mesh.

34. The electrochemical converter assembly of claim 28 further comprising reactant flow means including
first aperture means forming one or more first centrally disposed reactant manifolds in said converter element for introducing one of a fuel reactant and an oxidizer reactant to said converter element, and
second aperture means forming one or more second reactant manifolds in said converter element, outwardly spaced from said first central manifold, for introducing the other of said reactants.

35. The electrochemical converter assembly of claim 34 further comprising third aperture means outwardly spaced from said first and second aperture means, for forming at least one third manifold for removing spent fuel from said converter element.

36. The electrochemical converter assembly of claim 35 wherein said third aperture means facilitates removal of $CO_2$ from said converter assembly prior to discharge at said converter periphery.

37. The electrochemical converter assembly of claim 36 further comprising reforming means for reforming said fuel reactant into $H_2$ and CO.

38. The electrochemical converter assembly of claim 34 wherein said oxidizer reactant is introduced to said columnar converter element through said first manifold.

39. The electrochemical converter assembly of claim 38 wherein said fuel reactant is introduced to said converter element through said second manifold.

40. The electrochemical converter assembly of claim 33 wherein said sealer means is disposed along selected portions of said interconnector plate at least at one of said first and second manifolds, to selectively allow at least one of said fuel and oxidizer reactants to flow through said reactant-flow passageways.

41. The electrochemical converter assembly of claim 28 wherein said sealer means is a filler material.

42. The electrochemical converter assembly of claim 28 further comprising thermal enclosure means, enclosing said electrochemical converter assembly, for collecting said spent reactants discharged from said converter element at said peripheral edge.

43. The electrochemical converter assembly of claim 42 wherein said thermal enclosure means is a heat conduit.

44. The electrochemical converter assembly of claim 42 wherein said thermal enclosure means conveys said collected spent reactants to a bottoming plant.

45. The electrochemical converter assembly of claim 44 wherein said thermal enclosure means includes means for fastening said thermal enclosure means to said bottoming plant.

46. The electrochemical converter assembly of claim 44 wherein fuel and oxidizer reactants introduced to said converter assembly are preheated in said bottoming plant.

47. The electrochemical converter assembly of claim 44 wherein said bottoming plant is adapted to reform a fuel reactant introduced to said assembly.

48. The electrochemical converter assembly of claim 28 wherein said converter assembly has a substantially columnar shape.

49. The electrochemical converter assembly of claim 28 wherein said converter assembly has a substantially rectilinear shape.

* * * * *